(12) United States Patent
Su (10) Patent No.: US 8,434,671 B1
(45) Date of Patent: May 7, 2013

(54) MANUFACTURING METHOD OF A FORGED GOLF CLUB HEAD

(76) Inventor: Chi-Hung Su, Tainan (TW)

( * ) Notice: Subject to any disclaimer, the term of this patent is extended or adjusted under 35 U.S.C. 154(b) by 0 days.

(21) Appl. No.: 13/568,973

(22) Filed: Aug. 7, 2012

(51) Int. Cl.
*B23K 31/02* (2006.01)
*A63B 53/04* (2006.01)

(52) U.S. Cl.
USPC .............................. 228/228; 228/227; 473/324

(58) Field of Classification Search .................. 228/227, 228/228; 473/324
See application file for complete search history.

(56) References Cited

U.S. PATENT DOCUMENTS 5,556,097 A * 9/1996 Endo et al. .................... 473/309
2002/0016217 A1* 2/2002 Takeda et al. ................. 473/324
2009/0042665 A1* 2/2009 Morales et al. ............... 473/305

* cited by examiner

*Primary Examiner* — Erin Saad
(74) *Attorney, Agent, or Firm* — Birch, Stewart, Kolasch & Birch, LLP (57) ABSTRACT

A manufacturing method of a forged golf club head has acts of: providing pre-forged strike element and the pre-forged hosel made with different materials, welding the hosel on a connecting end of the strike element, and press-forging the blank to form a main component of the golf club head. The main component of the golf club head may accomplish the golf club head. Otherwise, a pre-forged secondary component is welded on a back part of the strike face of the main component to accomplish the golf club head. The strike element and the hosel made of different materials are directly secured to each other to precisely form a predetermined, shape so that the following surface treating steps and the manufacturing time are reduced and the quality of the golf club head is enhanced.

11 Claims, 10 Drawing Sheets

MANUFACTURING METHOD OF A FORGED GOLF CLUB HEAD

BACKGROUND OF THE INVENTION

1. Field of the Invention

The present invention relates to a manufacturing method of a golf club head, especially to a manufacturing method of a forged gull club head.

2. Description of the Prior Arts

The conventional golf club heads are made of single steel by precision casting or forging. Since the conventional golf club heads are made of single material, the conventional golf club heads is limited in performance characteristics and cannot satisfy the golf players' demand for striking playability. For example, some of the conventional golf club heads are made of medium-carbon or low-carbon steels. Because the medium-carbo or low-carbon steels are softer, those conventional club heads can be easily manufactured, and the inclined angles of the hosels on those conventional club heads can be easily adjustable for loft and lie angles. However, the strike faces on those conventional club heads have low wear-resistance on the face and the face scorelines and cannot perform the thin face design to gain the long distance striking performance since the medium-carbon or low-carbon steels are softer. For another example, some of the conventional golf club heads are made of high-carbon steels or cast SS 17-4. Because the high-carbon steels or cast SS 17-4 are harder, the strike faces on those conventional club heads have high wear-resistance and can perform long distance striking. However, since the high-carbon steels are harder, manufacturing those conventional club heads is difficult, and the inclined angles of the hose's on those conventional club heads are not adjustable for loft and lie angles.

In order to overcome the problems of the conventional golf club heads made of single steel, some of the conventional golf club heads, such as wood golf club head, comprises a strike plate made of harder steel and a hosel made of softer steel and welded on the strike plate. Another sub-element is welded on the rear surface of the strike plate to form a golf club head made of different materials so that the aforementioned problem is overcame.

However, the manufacturing, process is thus made complicated since the head body and the strike plate are separately formed with different materials and then combined together by means of welding. Then surface machining or polishing is performed to remove the welding marks and to modify the shape of the conventional golf club head. The surface machining or polishing process is time-consumed and takes a lot of work, and the shape and the quality of the conventional golf club head is not easily controlled precisely.

To overcome the shortcomings, the present invention provides a manufacturing method of a forged golf club head to mitigate or obviate the aforementioned problems.

SUMMARY OF THE INVENTION

The main objective of the present invention is to provide a manufacturing method of a forged golf club head. The manufacturing method of a forged golf club head has acts of: providing pre-forged strike element and the pre-forged hosel made with different materials, welding the hosel on a connecting end of the strike element, and press-forging the blank to form a main component of the golf club head. The main component of the golf club head may accomplish the golf club bead. Otherwise, a pre-forged secondary component is welded on a back part of the strike face of the main component to accomplish the golf club head. The strike element and the hosel made of different materials are directly secured to each other to precisely form a predetermined shape so that the following surface treating steps and the manufacturing time are reduced and the quality of the golf club head is enhanced.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
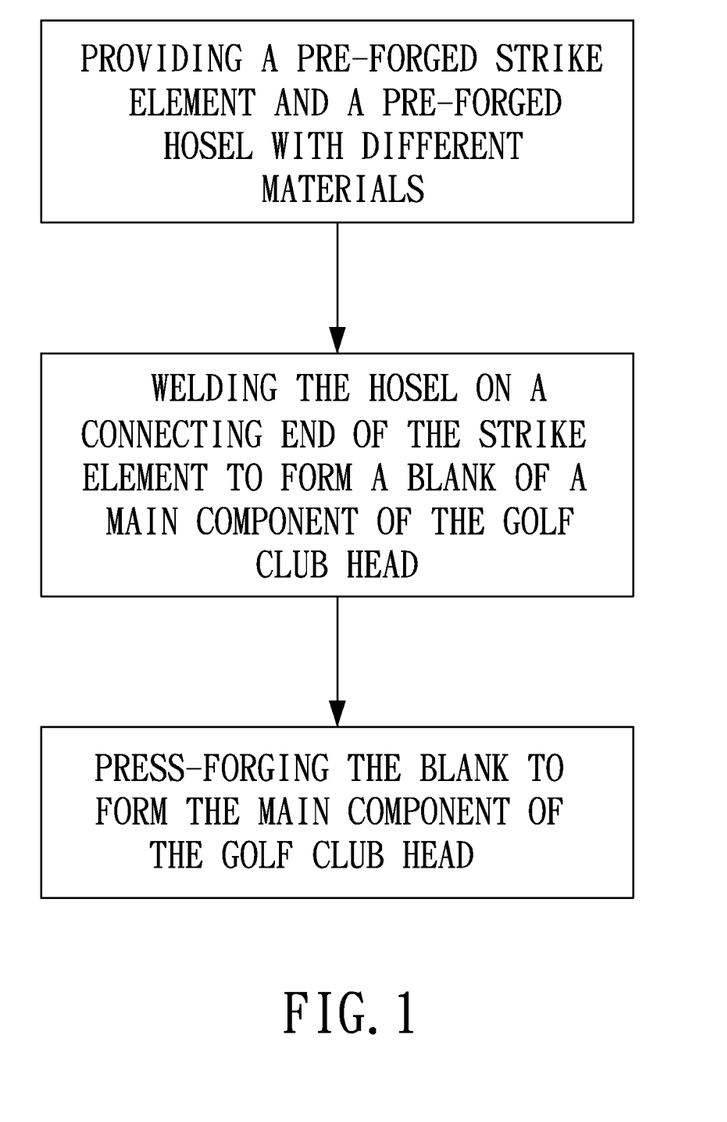
FIG. 1 is a flow chart of a manufacturing method of a forged golf club head in accordance with the present invention.

With reference to FIG. 1, a manufacturing method of a forged golf club head accordance with the present invention comprises following acts.

A pre-forged strike element and a pre-forged hosel are provided, which are made of different materials. The strike element comprises a strike face and a connecting end formed on an end of the strike face. The strike element is made of a metal material with high strength, high hardness, and high elasticity. The hosel is made of a soft metal material with low hardness and well ductility.

The hosel is welded on the connecting end of the strike element to form a blank of a main component of a golf club head.

The blank of the main component of the golf dub had is press-forged to form the main component of the golf club bead.

The manufacturing method as described is adapted to manufacture iron golf club head, wood golf club head and so on. For example, manufacturing an iron golf club head comprises following acts as shown in FIG. 1.

Figure 2:
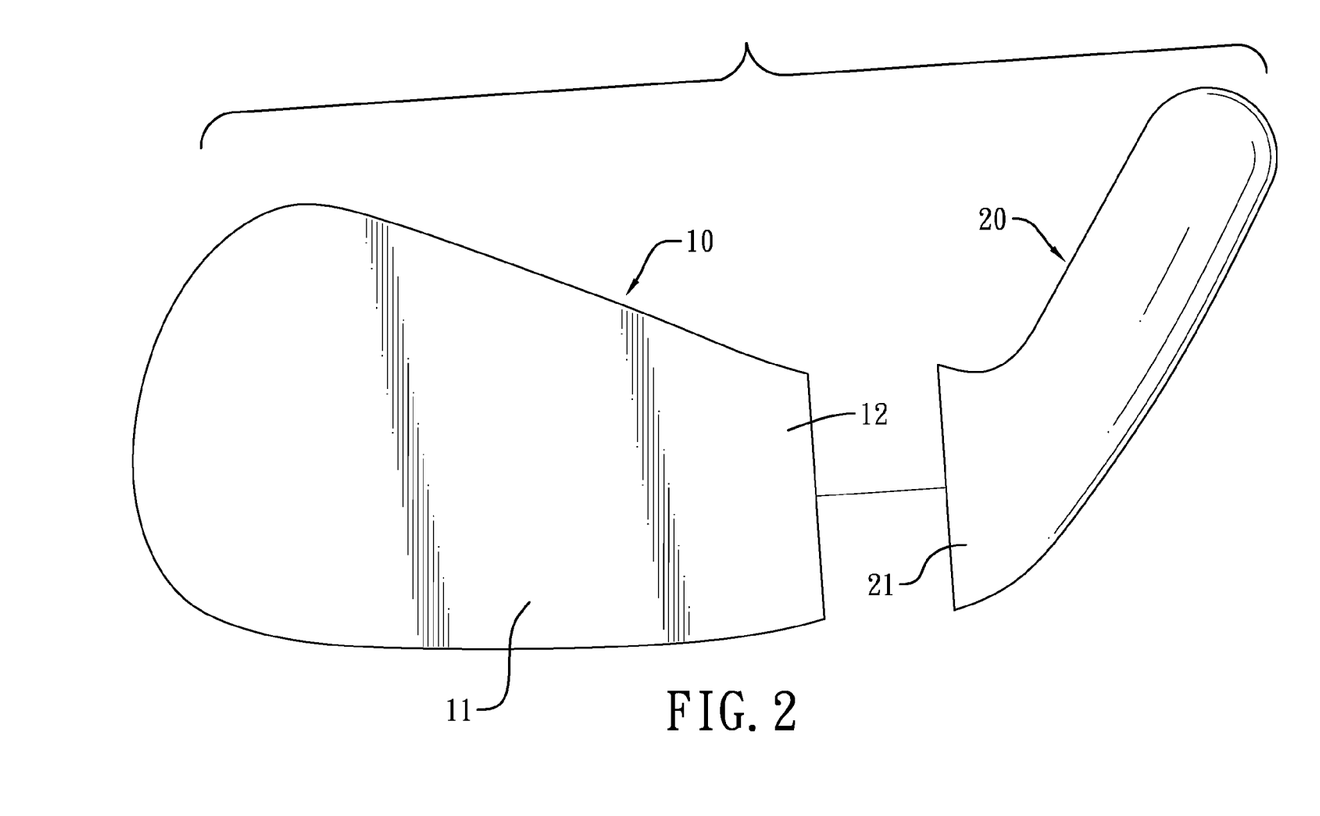
FIG. 2 is an exploded operational side view of the golf club head manufactured by the method in FIG. 1, showing that the strike element and the hosel is provided.

With further reference to FIG. 2, a pre-forged strike element 10 and a pre-forged hosel 20 are provided, which are made of different materials. The strike element 10 comprises a strike face 11, a connecting end 12 finned on an end of the strike face 11 and a back part formed on a rear surface of the strike face 11. The strike element 10 is made of a metal material with high strength, high hardness, and high elasticity, like a titanium alloy (such as Ti 6-4) or a high-carbon steel (such as high-carbon steel with high yield strength and high hardness). The hosel 20 comprises an attaching part 21 and is made of a soft metal material with low hardness and well ductility, like a titanium (such as GR-4) or a medium or low carbon steel (such as carbon steel 1020 C).

Figure 3:
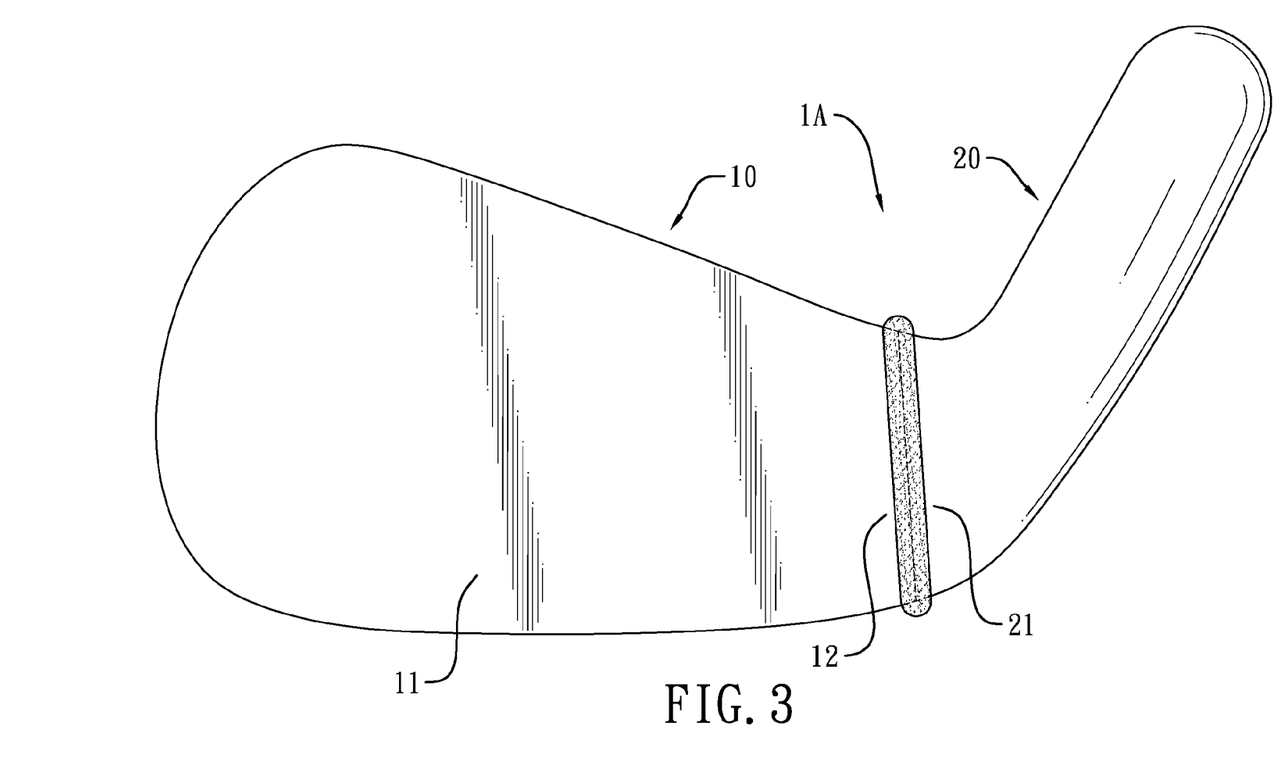
FIG. 3 is an operational side view of the golf club head manufactured by the method in FIG. 1, showing that the strike element and the hosel is welded.

With further reference to FIG. 3, the attaching part 21 of the hosel 20 is welded on the connecting end 12 of the strike element 10 to form a blank 1A of a main component of a golf club head.

Figure 4:
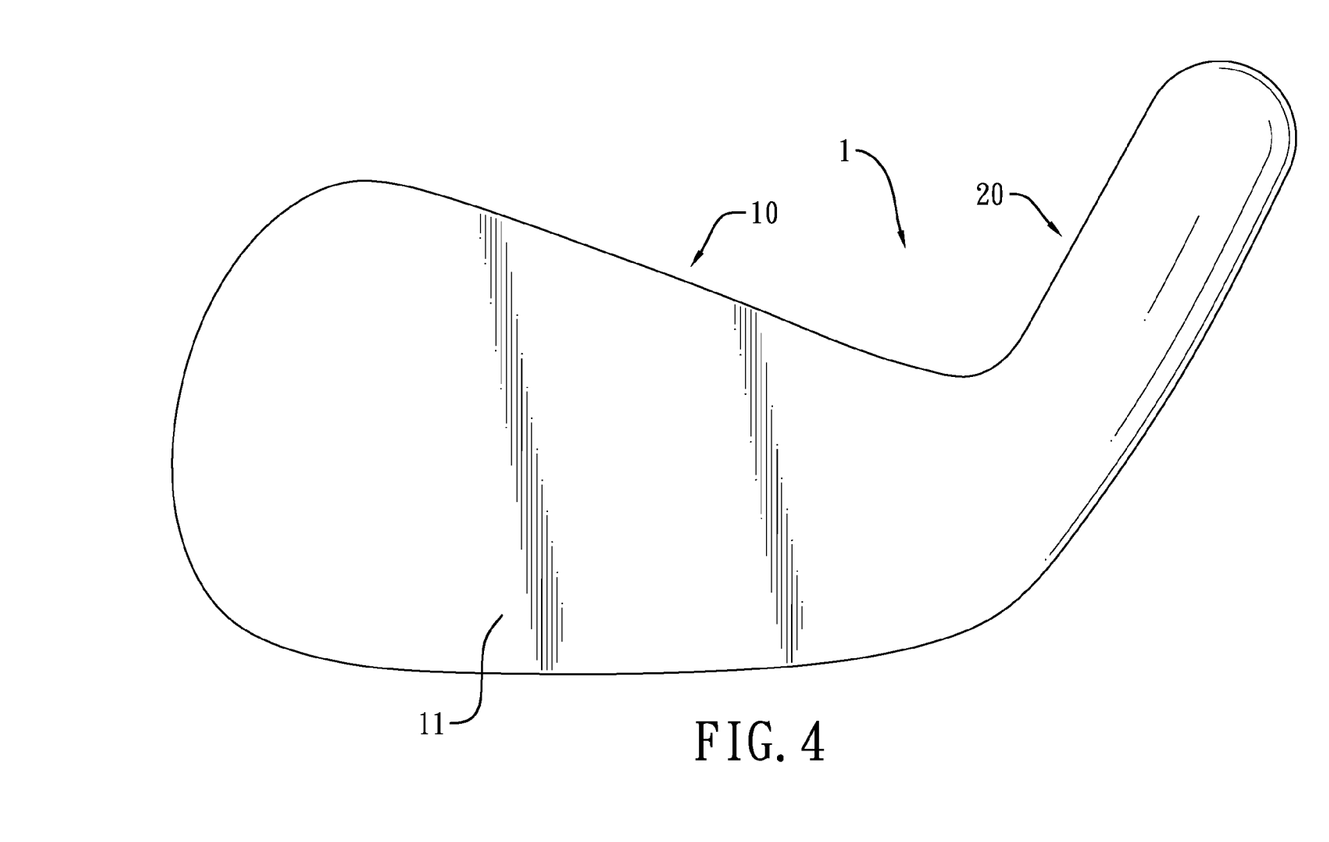
FIG. 4 is an operational side view of the golf club head manufactured by the method in FIG. 1, showing that the strike element and the hosel is forged.

With further reference to FIG. 4, the blank 1A of the main component of the golf club head is press-forged to form the main component 1 of the golf club head so that the welding mark between the hosel 20 and the connecting end 12 of the strike element 10 is also eliminated.

Figure 5:
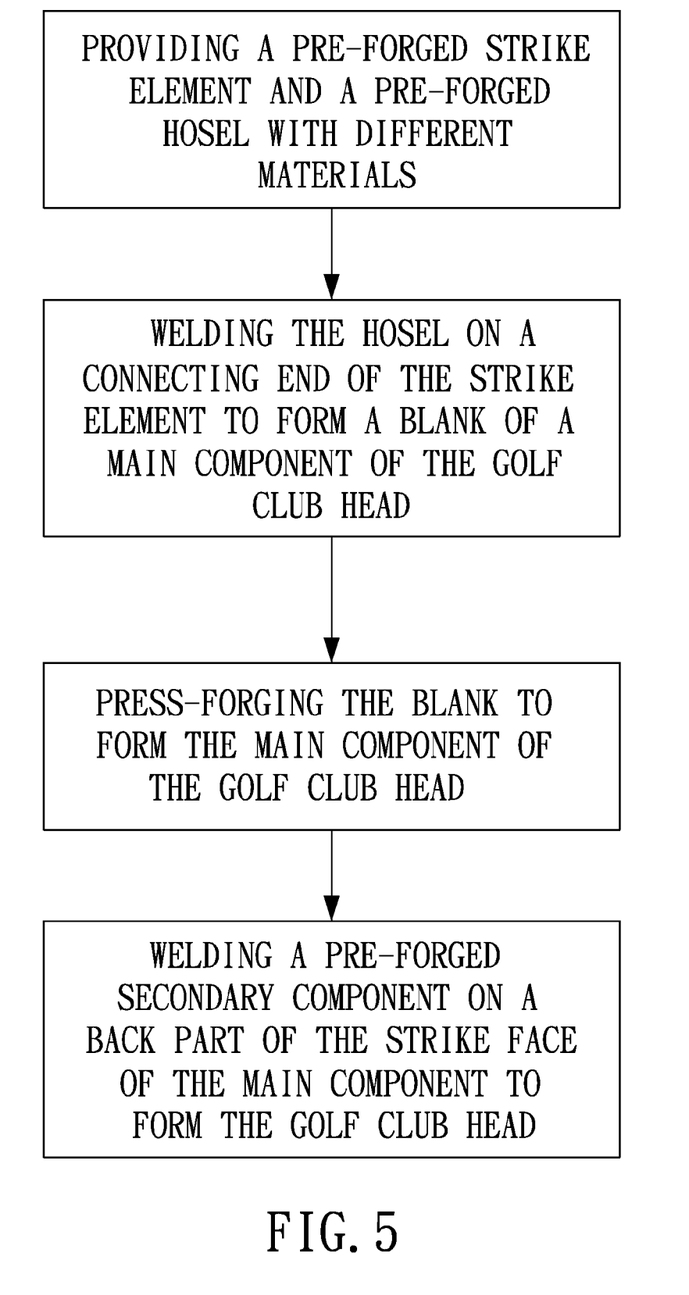
FIG. 5 is a flow chart of another embodiment of a manufacturing method of a forged golf club head in accordance with the present invention.
Figure 6:
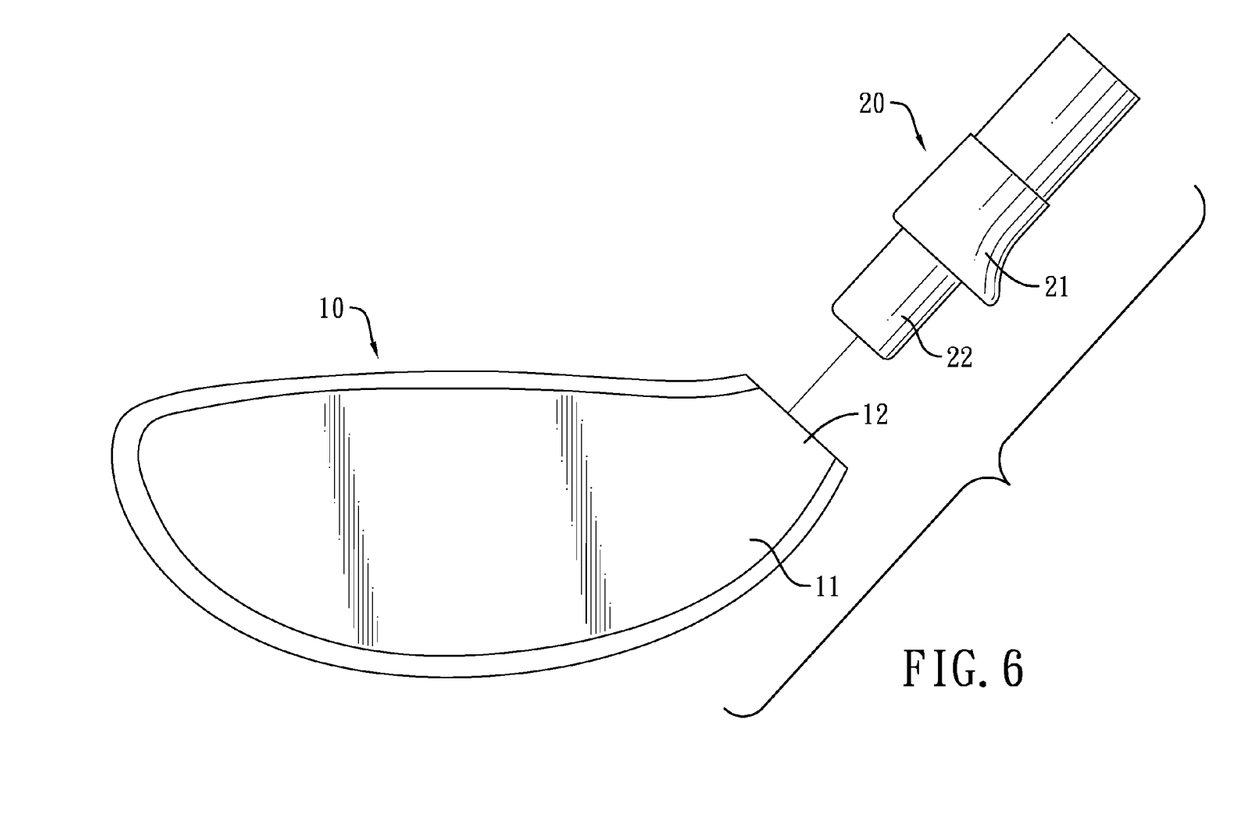
FIG. 6 is an exploded operational side view of a strike element and a hosel of the golf club head manufactured by the method in FIG. 5, showing that the strike element and the hosel is provided.

For another example, manufacturing a wood golf club head comprises following acts as shown in FIG. 5. With further reference to FIG. 6, a pre-forged strike element 10 and a pre-forged hosel 20 are provided, which are made of different materials. The strike element 10 comprises a strike face 11, a connecting end 12 formed on an end of the strike face 11 and a hack part formed on a rear surface of the strike face 11. The strike element 10 is made of a metal material with high strength, high hardness, and high elasticity, like a titanium alloy (such as Ti 6-4) or a high-carbon steel (such as high-carbon steel with high yield strength and high hardness). The hosel 20 comprises an attaching part 21 and a protruding part 22 and is made of a soft metal material with low hardness and well ductility, like a titanium such as (GR-4) or a medium or low carbon steel (such as carbon steel 1020 C). The protruding part 22 extends from the attaching part 21 and has a radius smaller than a radius of the attaching part 21.

Figure 7:
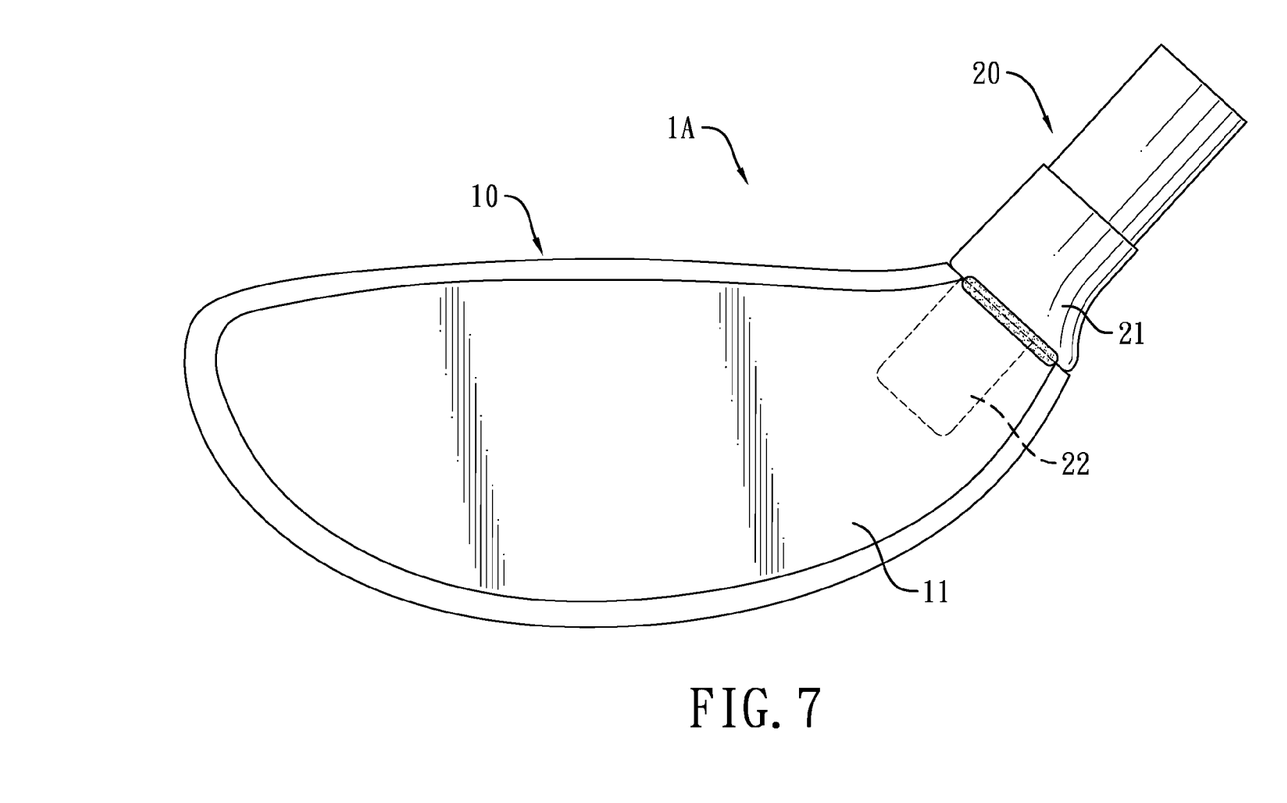
FIG. 7 is an operational side view of the strike element and the hosel of the golf club head manufactured by the method in FIG. 5, showing that the strike element and the hosel is welded.

With further reference to FIG. 7, the attaching part 21 of the hosel 20 is welded on the connecting end 12 of the strike element 10, and the protruding part 22 is mounted on the rear surface of the strike face 11 of the strike element 10 to form as blank 1A of a main component of a golf club head.

Figure 8:
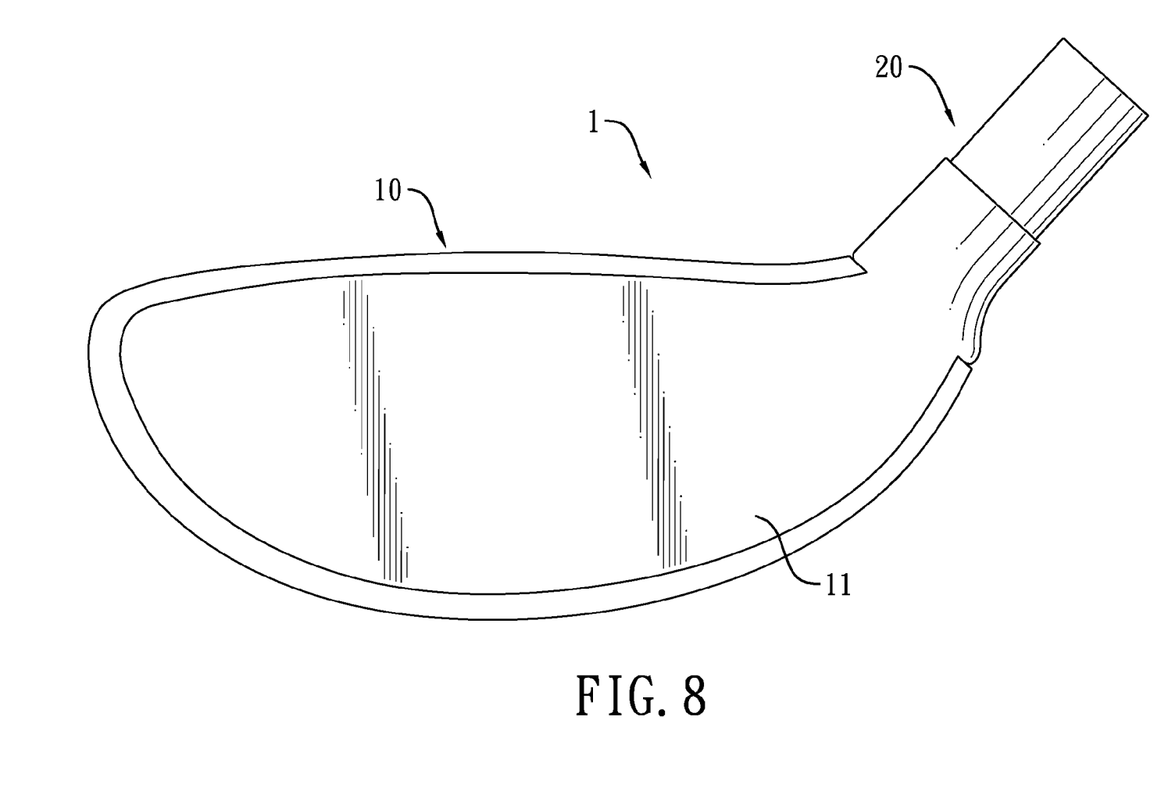
FIG. 8 is an operational side view of the strike element and the hosel of the golf club head manufactured by the method in FIG. 5, showing that the strike element and the hosel is forged.

With further reference to FIG. 8, the blank 1A of the main component of the golf club head is press-forged to form the main component 1 of the golf club head so that the welding mark between the hosel 20 and the connecting end 12 of the strike element 10 is also eliminated. A pre-forged secondary component of the golf club head is provided. The secondary component of the golf club head is welded on the back part of the strike face 11 of the main component 1 to form the golf club head.

Figure 9:
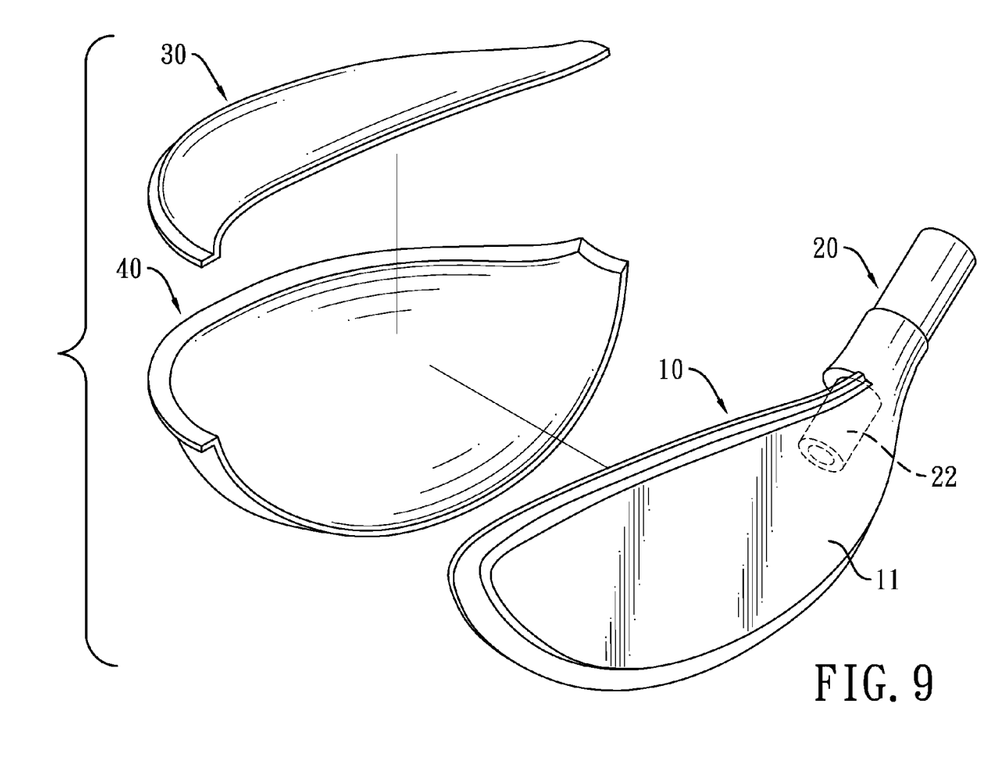
FIG. 9 is an exploded perspective view of the golf club head manufactured by the method in FIG. 5.
Figure 10:
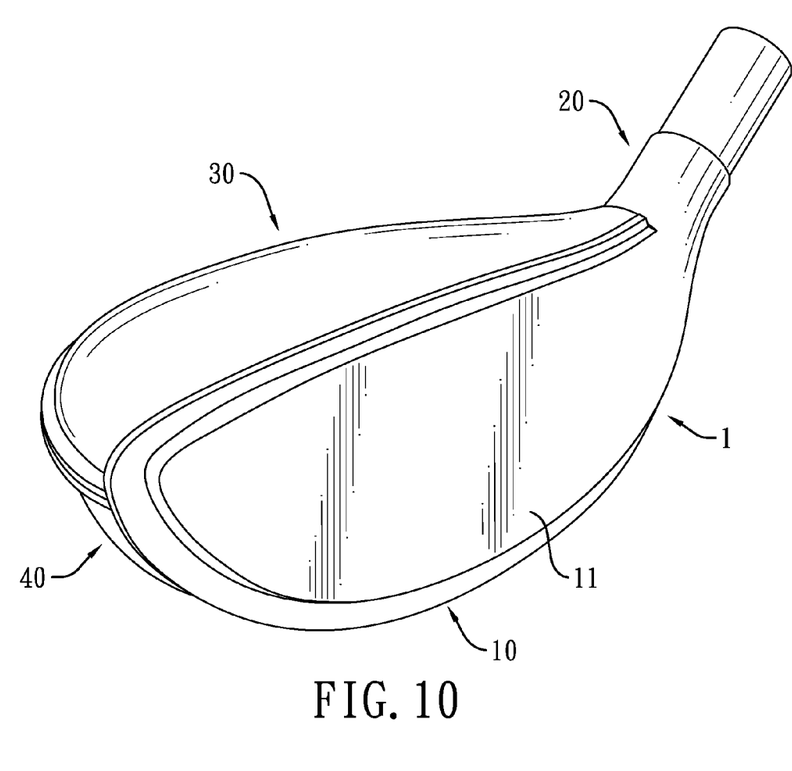
FIG. 10 is a perspective view of the golf club head manufactured by the method in FIG. 5.

The secondary component of the golf club head is made according to the desired shape of the golf club head and may comprise single part or multiple parts. The secondary component of the golf club head is made of a material that may be the same or different with the material of strike element 10. With further reference to FIGS. 9 and 10, the wood golf club head has a top cap 30 and a base 40. The top cap 30 and the base 30 are welded respectively on a top and a bottom the hack part of the strike face 11 of the main component 1 of the golf dub head to form the hollow wood golf dub bead.

When the golf club head as described is complete, the golf club head as described may be further surface treated, such as grinding, polishing, spray painting, electroplating and so on. Then the hosel is attached securely to a shaft to accomplish the golf dub. The golf club head as described has the strike element and the hosel with different materials. Therefore, when the golf club head as described hits the ball, the strike face with high strength, high hardness, and high elasticity enhances the striking distance and the striking stability. Further, the angle of the soft hosel with low hardness and well ductility is easily adjusted. Moreover, the soft hosel absorbs the shock to the user's hand and the user gets the soft feeling when the golf club head hits the ball.

Even though numerous characteristics and advantages of the present invention have, been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A manufacturing method of a forged golf club head comprising acts of:
    providing a pre-forged strike element and a pre-forged hosel, wherein the strike element and the hosel are made of different materials, and the strike element having a strike face and a connecting end formed on an end of the strike face;
    welding an attaching part of the hosel on the connecting end of the strike element to form a blank of a main component of the golf club head; and
    press-forging the blank of the main component of the golf club head to form the main component of the golf club head and remove the welding mark.

2. The manufacturing method as claimed in claim 1, wherein
    in the step of providing pre-forged strike element, the strike element has a back part formed on as rear surface of the strike, face; and
    in the step of press-forging the blank, the main component is made.

3. The manufacturing method as claimed in claim 1 further comprising: providing a pre-forged secondary component of the golf club head and welding the secondary component of the golf club head on a back part of the strike face of the main component to form the golf club head after press-forging the main blank.

4. The manufacturing method as claimed in claim 3, wherein
    in the step of providing the pre-forged hosel, the pre-forged hosel has a protruding part extending from the attaching part and having a radius smaller than a radius of the attaching part;
    in the step of welding the hosel, the protruding part is mounted on the rear surface of the strike face of the strike element; and
    in the step of providing the secondary component, the secondary component has a top cap and a base, and, the top cap and the base are welded respectively on a top and a bottom the back part of the strike face of the main component to form a hollow wood golf club head.

5. The manufacturing method as claimed in claim 1, wherein in the step of providing the strike element and the hosel, the strike element is made of titanium alloy and the hosel is made of titanium.

6. The manufacturing method as claimed in claim 3, wherein in the step of providing the strike element and the hosel, the strike element is made of titanium alloy and the hosel is made of titanium.

7. The manufacturing method as claimed, in claim 4, wherein in the step of providing the strike element and the hosel, the strike element is made of titanium alloy and the hosel is made of titanium.

8. The manufacturing method as claimed in claim 1, wherein in the step of providing the strike element and the hosel, the strike element is made of high carbon steel and the hosel is made of medium or low carbon steel.

9. The manufacturing method as claimed in claim 2, wherein in the step of providing the strike element and the hosel, the strike element is made of high carbon steel and the hosel is made of medium or low carbon steel.

10. The manufacturing method as claimed in claim 3, wherein in the step of providing the strike element and the hosel, the strike element, is made of high carbon steel and the hosel is made of medium or low carbon steel.

11. The manufacturing method as claimed in claim 4, wherein in the step of providing the strike element and the hosel, the strike element is made of high carbon steel and the hosel is made of medium or low carbon steel.

* * * * *